[11] 3,593,791

| [72] | Inventor | Harry W. Parker Bartlesville, Okla. |
| --- | --- | --- |
| [21] | Appl. No. | 858,038 |
| [22] | Filed | Sept. 15, 1969 |
| [45] | Patented | July 20, 1971 |
| [73] | Assignee | Phillips Petroleum Company |

[54] HORIZONTAL FRACTURING TECHNIQUES FOR BITUMEN RECOVERY
7 Claims, 1 Drawing Fig.

[52] U.S. Cl. ................................................ 166/271, 166/272, 166/308
[51] Int. Cl. ................................................ E21b 43/24, E21b 43/25
[50] Field of Search ........................................ 166/271, 272, 280, 283, 308

[56] References Cited
UNITED STATES PATENTS

| 2,859,818 | 11/1958 | Hall et al. ............... | 166/308 UX |
| --- | --- | --- | --- |
| 2,965,172 | 12/1960 | Da Roza ................ | 166/308 |
| 3,155,161 | 11/1964 | Tadema ................. | 166/308 |
| 3,284,281 | 11/1966 | Thomas ................. | 166/271 X |
| 3,455,391 | 7/1969 | Matthews et al. ...... | 166/308 X |

*Primary Examiner*—Ian A. Calvert
*Attorney*—Young and Quigg

ABSTRACT: A method is disclosed for forming a subterranean horizontal fracture while minimizing the formation of subterranean vertical fractures by employing a fracturing fluid having a specific gravity greater than the specific gravity of that stratum through which the horizontal fracture is to be formed.

PATENTED JUL 20 1971 3,593,791
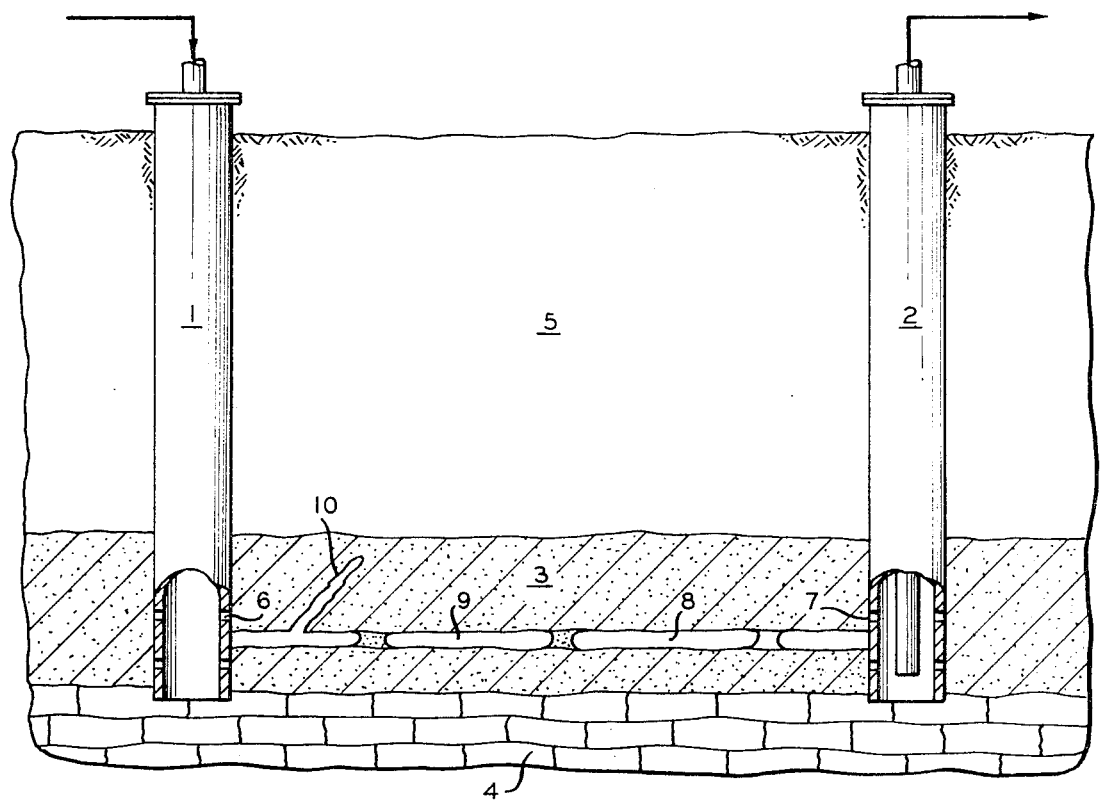
INVENTOR.
H. W. PARKER
BY
Young & Quigg
ATTORNEYS

HORIZONTAL FRACTURING TECHNIQUES FOR BITUMEN RECOVERY

This invention relates to a method for recovery of bitumen from subterranean deposits.

In one of its more specific aspects, this invention relates to the creation of fracture patterns in subterranean bituminous-bearing formations as a means of facilitating the recovery of bituminous products therefrom.

The use of various recovery techniques for the recovery of petroleum from subterranean reservoirs is well known. Many such techniques involve the use of at least two wells penetrating the same formation and spaced from each other, injection of an extraneous material being made into one of the wells and recovery of petroleum being made from the other well.

In such an operation, it is desirable to create one or more substantially horizontal subterranean fractures within the bitumen-bearing stratum between the related wells to facilitate the employment of extraneous materials for removal of the bitumen. Frequently, however, techniques employed to create such fractures are unsuccessful because such fractures as do occur take place in such a direction that no communication is established between the wells.

The establishment of such fractures between related wells in tar sands is of considerable significance due to the unusual nature of tar sand deposits, particularly their low permeability. However, in these formations too, vertical fractures rather than horizontal fractures are prone to occur and the likelihood of connecting an array of injection and production wells by horizontal fractures is quite small. In general, recovery problems of bitumen from such deposits would be largely solved by a method which facilitated the establishment of substantially horizontal fractures between adjacently positioned wells, inasmuch as thereafter it would be a relatively simple matter to increase the size of the horizontally positioned fracture by down-hole injection of such materials as aid in the removal of the desirable deposits. The method of this invention provides a process for horizontal orientation of such fractures.

According to the method of this invention there is provided a method for restricting fractures formed through subterranean strata to fractures occurring in substantially horizontal directions which comprises employing as a fracturing fluid a liquid having a specific gravity substantially equal to the specific gravity of the unconsolidated formation through which the horizontal fracture is to be formed.

In one of its embodiments, this invention employs as a component of the fracturing fluid an extraneous propping material for the purpose of converting the fracture to a stable flow channel.

In one of its embodiments, this invention employs the fracturing fluid at an elevated temperature, the fluid being circulated through the fracture to mobilize the tars adjacent to the fracture and to remove tar from the fracture with the fracturing fluid.

Accordingly, it is an object of this invention to provide a process for recovery of bitumen from the sands.

It is another object of this invention to increase bitumen recovery from tar sands.

The method of this invention contemplates the use of a weighted fracturing fluid whose specific gravity approximates that of the unconsolidated formation to be fractured. It further contemplates the injection of the fracturing fluid into the stratum to be fractured under such conditions that tendencies of the fracturing fluid to migrate vertically will be offset by the hydrostatic head developed by the fracturing fluid under the conditions to which it is subjected. The specific gravity of the fracturing fluid preferably will be greater than that of the stratum preferentially fractured but will be less than that of the underburden.

In the application of the method of this invention, at least one injection well is drilled and cased to near the bottom of the stratum to be fractured. One or more production or recovery wells are drilled to substantially the same depth at suitable distances from the injection well and the fracturing fluid is injected into the stratum to be fractured through the injection well. Due to the specific gravity of the fracturing fluid, little or no pressure will be required to be applied from the point of injection. Injection is continued until a substantially horizontal fracture is formed by the hydrostatic head of the fracturing fluid, this fracture intercepting one or more of the production wells. Conventional means are then employed to maintain the fracture and to conduct recovery operations.

The method of this invention will be more easily understood if explained in conjunction with the attached drawing which illustrates one embodiment of the invention in which single injection and production wells are employed.

Referring now to the drawing, there are shown casings 1 and 2 which have been established in boreholes drilled into sand formation or stratum 3 which is in an unconsolidated or partially consolidated oil-bearing formation containing a tarlike crude. While the formation is of a permeable nature, the pores between the grains are substantially filled with a very viscous oil or tarlike crude which will not flow through the formation without application of an extraneous force. Thus, the formation is not fluid permeable to any significant extent and to make it fluid permeable, it must be fractured. Formation 3 containing the viscous oil may be close to the earth's surface or may be covered by overburden 5. It will generally be limited by a less pervious formation 4. Borehole casings 1 and 2 are positioned in any suitable spaced relationship. Suitable apertures 6 are formed in casing 1 and apertures 7 are formed in casing 2, these apertures allowing fluid communication from casing 1 into stratum 3 and from stratum 3 into casing 2.

The fracturing medium is a fluid, injected under pressure if desired, into injection well casing 1 and through apertures 6 into stratum 3 under conditions sufficient to fracture formation 3 and create therethrough fracture 8 extending radially and substantially horizontally from casing 1 and intercepting casing 2 of the production well. The specific gravity of the fracturing liquid is preferably greater than that of the sand formation 3 but less dense than that of the underburden 4.

Assuming, for example, that the underburden has a specific gravity of 2.5 in relation to water, while the tar sand formation has a specific gravity of from about 1.85 to about 2.2, a fracturing liquid having a specific gravity of about 2.0 to about 2.5 is preferably employed. Fracturing fluids of such gravities can be prepared by adding particulate barium sulfate, iron oxide, lead oxide and other dense materials to water to form aqueous slurries. Amounts of viscosifying agents such as bentonite and synthetic high molecular weight, water-soluble polymers can be incorporated in the fluid to maintain the dense solids in suspension. Similarly, conventional propping agents can be included in the fracturing liquid.

The high specific gravity of the fracturing liquid facilitates the formation of substantially horizontal fractures and minimizes the formation of substantially vertically extending fractures due to the hydraulic forces established by the high gravity fluid. For example, the force required to extend a fracture from any point 9 in a horizontal direction is the sum of the product of the height of the strata thereabove and the density of those strata.

To extend a substantially vertical fracture, assuming one exists to point 10, the force available is the bottom hole pressure less the product of the vertical distance between fracture 8 and point 10 and the density of the fracturing liquid, this being equivalent to the difference in static heads. However, the force required to extend the fracture at point 10 is the product of the height of the tar sand thereabove and the density of the tar sand formation, this being, in turn, equal to the bottom hole pressure less the product of the height of point 10 above fracture 8 and the average density of the tar sand. Accordingly, at point 10 this latter value can be maintained greater than the force available to extend the fracture at point 10 by maintaining the density of the fracturing fluid greater than the density of the tar sand formation.

To extend a fracture at point 8 in a substantially horizontal direction, the force required will be the sum of the product of the height of stratum 3 thereabove and its density and the product of the height of stratum 5 and its density. The force required to extend a fracture at point 10 in a substantially vertical direction will be the bottom hole pressure less the product of the height of stratum 3 to point 10 and the density of stratum 3. However, the force available to extend a fracture at point 10 in a substantially vertical direction will be equal to bottom hole pressure less the product of the height of stratum 3 to point 10 and the density of the fracturing fluid. Inasmuch as the force required to extend the fracture in a substantially horizontal direction is less than that force available to extend the fracture from point 10 in a substantially vertical direction, the fracture will preferably take place substantially horizontally along fracture 8.

While the present example has been limited to a single injection well and a single recovery well, it is apparent that combination of injection wells and recovery wells can be employed, the recovery wells being positioned at points generally circumferential to the injection wells, a plurality of substantially horizontal fractures extending radially from the injection well to the recovery wells.

Solutions of the specific gravities prescribed herein can be prepared in a number of ways in addition to those previously mentioned. Similarly, various modifications can be employed in the method described. Such methods include heating the fracturing fluid and injecting it while hot with the result that the viscosity of the fracturing fluid is decreased while its tendency to dissolve some portion of the deposit and remove the dissolved deposit is increased.

It will be evident that other modifications can be made to the method of this invention. Such are considered, however, as being within the scope of the invention.

What I claim is:

1. A method for forming fractures through an unconsolidated formation overlying an underburden, said underburden having a specific gravity greater than the specific gravity of said unconsolidated formation, said fractures being formed in a substantially horizontal direction which comprises injecting into said formation a fracturing fluid having a specific gravity at least equal to the specific gravity of said unconsolidated formation, said fluid having a specific gravity less than the specific gravity of said underburden.

2. The method of claim 1 in which said fracturing fluid has included therein a propping material.

3. The method of claim 1 in which said fracturing fluid is injected into said unconsolidated formation through at least one injection well and flows through said fracture to at least one production well.

4. The method of claim 1 in which said fracturing fluid comprises an aqueous slurry of a material selected from the group consisting of barium sulfate, iron oxide and lead oxide.

5. The method of claim 1 in which said fracturing fluid has a specific gravity from about 2.0 to about 2.5.

6. The method of claim 1 in which the fracturing fluid is injected at elevated pressure into an injection well, a plurality of fractures being formed and extending radially from the injection well to a plurality of recovery wells.

7. The method as defined in claim 1 in which the specific gravity of said fracturing fluid is greater than the specific gravity of said unconsolidated formation.